D. F. WELCH.
CORN HUSKER.
No. 106,436. Patented Aug. 16, 1870.
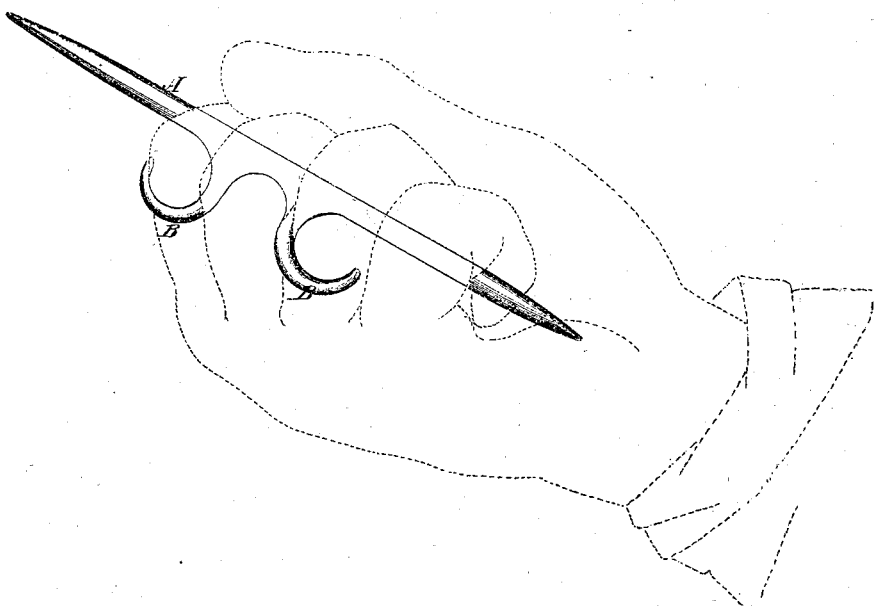
Witnesses:
Gustave Dieterich
L. S. Mabee
Inventor:
D. F. Welch
Per
[signature]
Attorneys.

United States Patent Office.

DWIGHT F. WELSH, OF BUCYRUS, OHIO.

Letters Patent No. 106,436, dated August 16, 1870.

IMPROVEMENT IN CORN-HUSKERS.

The Schedule referred to in these Letters Patent and making part of the same

*To all whom it may concern:*

Be it known that I, DWIGHT F. WELSH, of Bucyrus, in the county of Crawford and State of Ohio, have invented a new and improved Corn-Husker; and I do hereby declare that the following is a full, clear, and exact description thereof, which will enable others skilled in the art to make and use the same, reference being had to the accompanying drawing forming part of this specification.

My invention relates to corn-huskers, formed of pointed pieces of metal, and affixed in some convenient manner to the hand; and It consists in the arrangement thereon of curved projections to receive the fingers of either hand, and of different persons.

The drawing represents a perspective view of the husker as held in the hand of the husker.

A is the rod, pointed at one or both ends.

B represents the hooks, which are shaped so as to extend between the fingers and partly around them at the back, as shown in the drawing.

Preferably these hooks are made so that they may be bent more or less to fit them to any fingers, and they may either pass between the same fingers or between different ones.

If they are to pass between the same fingers, they will be arranged close together on the rod. I prefer to arrange them as shown in the drawing.

Having thus described my invention,

I claim as new and desire to secure by Letters Patent—

The arrangement upon the pointed husker A of two projections, B B, at a finger's distance apart, and curved away from each other, as shown in the drawing, to furnish separate receptacles for three different fingers, as set forth.

DWIGHT F. WELSH.

Witnesses:
S. R. HARRIS,
JOSEPH RIMMEE,
C. W. YIMAMIS.